(12) United States Patent
Nakano

(10) Patent No.: US 11,513,651 B1
(45) Date of Patent: Nov. 29, 2022

(54) DETECTING DEVICE AND DETECTION SYSTEM

(71) Applicant: Japan Display Inc., Tokyo (JP)

(72) Inventor: Fumihoru Nakano, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/726,834

(22) Filed: Apr. 22, 2022

(30) Foreign Application Priority Data

Apr. 28, 2021 (JP) .............................. JP2021-076584
Mar. 29, 2022 (JP) .............................. JP2022-054474

(51) Int. Cl.
*G06F 3/044* (2006.01)
*G06V 40/13* (2022.01)
*G06F 3/041* (2006.01)

(52) U.S. Cl.
CPC ........ *G06F 3/0446* (2019.05); *G06F 3/04182* (2019.05); *G06V 40/1306* (2022.01)

(58) Field of Classification Search
CPC .............. G06F 3/0446; G06F 3/04182; G06V 40/1306
See application file for complete search history.

(56) References Cited

U.S. PATENT DOCUMENTS

| 11,437,442 | B2 * | 9/2022 | Lee | ........................ H01L 27/323 |
| 2006/0158202 | A1 * | 7/2006 | Umeda | ............... G06F 3/04182 324/686 |
| 2015/0323578 | A1 * | 11/2015 | Shahrokhi | .......... G01R 27/2605 345/174 |
| 2016/0139725 | A1 * | 5/2016 | Noguchi | ............... G06F 3/0412 345/174 |
| 2016/0209963 | A1 * | 7/2016 | Chang | ................ G06F 3/04166 |
| 2017/0139539 | A1 * | 5/2017 | Yao | ....................... G06F 3/04166 |
| 2017/0185198 | A1 * | 6/2017 | Shepelev | ............... G06F 3/0446 |
| 2019/0102020 | A1 * | 4/2019 | Suzuki | .................... G06F 3/0412 |

FOREIGN PATENT DOCUMENTS

JP        2005-152223 A    6/2005

* cited by examiner

*Primary Examiner* — Amit Chatly
(74) *Attorney, Agent, or Firm* — K&L Gates LLP

(57) ABSTRACT

A detecting device includes a plurality of first electrodes extending in a first direction and a plurality of second electrodes extending in a second direction intersecting the first direction, the first electrodes and the second electrodes being disposed facing each other with an insulating layer interposed therebetween, a first electrode selection circuit configured to supply a drive signal to the first electrodes, and a detection circuit configured to detect capacitance generated between the first electrodes and the second electrodes due to the drive signal.

12 Claims, 13 Drawing Sheets

|     | t1 | t2 | t3 | t4 | t5 | t6 | t7 | t8 |
|-----|------|------|------|------|------|------|------|------|
|     | CDM1 | CDM2 | CDM3 | CDM4 | CDM5 | CDM6 | CDM7 | CDM8 |
| Tx1 | 1 | 1 | 1 | 1 | 1 | 1 | 1 | 1 |
| Tx2 | 1 | 0 | 1 | 0 | 1 | 0 | 1 | 0 |
| Tx3 | 1 | 1 | 0 | 0 | 1 | 1 | 0 | 0 |
| Tx4 | 1 | 0 | 0 | 1 | 1 | 0 | 0 | 1 |
| Tx5 | 1 | 1 | 1 | 1 | 0 | 0 | 0 | 0 |
| Tx6 | 1 | 0 | 1 | 0 | 0 | 1 | 0 | 1 |
| Tx7 | 1 | 1 | 0 | 0 | 0 | 0 | 1 | 1 |
| Tx8 | 1 | 0 | 0 | 1 | 0 | 1 | 1 | 0 |

FIG.5

$$(\text{FINGERPRINT PATTERN}) = \begin{pmatrix} 1 & 1 & 1 & -1 & 1 & -1 & 1 & 1 \\ 1 & -1 & 1 & -1 & -1 & -1 & 1 & 1 \\ 1 & -1 & -1 & -1 & 1 & -1 & -1 & -1 \\ 1 & 1 & -1 & -1 & -1 & 1 & -1 & 1 \\ 1 & -1 & -1 & -1 & 1 & -1 & 1 & -1 \\ 1 & -1 & -1 & -1 & -1 & -1 & 1 & -1 \\ 1 & -1 & 1 & -1 & -1 & -1 & 1 & 1 \\ 1 & 1 & 1 & 1 & 1 & 1 & 1 & 1 \end{pmatrix} \times \begin{pmatrix} D_{11} & D_{12} & D_{13} & D_{14} & D_{15} & D_{16} & D_{17} & D_{18} \\ D_{21} & D_{22} & D_{23} & D_{24} & D_{25} & D_{26} & D_{27} & D_{28} \\ D_{31} & D_{32} & D_{33} & D_{34} & D_{35} & D_{36} & D_{37} & D_{38} \\ D_{41} & D_{42} & D_{43} & D_{44} & D_{45} & D_{46} & D_{47} & D_{48} \\ D_{51} & D_{52} & D_{53} & D_{54} & D_{55} & D_{56} & D_{57} & D_{58} \\ D_{61} & D_{62} & D_{63} & D_{64} & D_{65} & D_{66} & D_{67} & D_{68} \\ D_{71} & D_{72} & D_{73} & D_{74} & D_{75} & D_{76} & D_{77} & D_{78} \\ D_{81} & D_{82} & D_{83} & D_{84} & D_{85} & D_{86} & D_{87} & D_{88} \end{pmatrix}$$

DETECTING DEVICE AND DETECTION SYSTEM

CROSS-REFERENCE TO RELATED APPLICATION

This application claims the benefit of priority from Japanese Patent Application No. 2021-076584 filed on Apr. 28, 2021, and Japanese Patent Application No. 2022-054474 filed on Mar. 29, 2022, the entire contents of which are incorporated herein by reference.

BACKGROUND

1. Technical Field

The present disclosure relates to a detecting device and a detection system.

2. Description of the Related Art

There have recently been demands for detecting a fingerprint used for personal authentication, for example, by a capacitive system. In detecting a fingerprint, electrodes with a smaller area are used than in detecting contact of a hand or a finger. To obtain signals from small electrodes, code division multiplexing drive that provides excellent detection sensitivity is employed. Code division multiplexing drive is a drive system that simultaneously selects a plurality of drive electrodes and supplies drive signals the phases of which are determined based on a predetermined code, to the selected drive electrodes (refer to Japanese Patent Application Laid-open Publication No. 2005-152223 (JP-A-2005-152223)). In the fingerprint sensor described in JP-A-2005-152223, a code generator generates a code corresponding to a plurality of column wires, and a column wiring driver divides the column wires into a first wiring group and a second wiring group based on the code and drives each of the groups.

In the technology described in JP-A-2005-152223, the value of capacitance formed between drive electrodes and detection electrodes changes depending on the number of simultaneously selected drive electrodes. Specifically, as the number of simultaneously selected drive electrodes increases, the value of capacitance formed between the drive electrodes and the detection electrodes increases. Therefore, if the number of simultaneously selected drive electrodes is large, detection signals output from the detection electrodes may possibly be clipped. If the gain is designed to match with a state where the number of simultaneously selected drive electrodes is relatively large, the detection signals output from the detection electrodes may possibly be made small when the number of simultaneously selected drive electrodes is relatively small, thereby reducing the detection accuracy.

An object of the present disclosure is to provide a detecting device and a detection system that can suppress clipping of detection signals and achieve excellent fingerprint detection.

SUMMARY

A detecting device according to an embodiment of the present disclosure includes a plurality of first electrodes extending in a first direction and a plurality of second electrodes extending in a second direction intersecting the first direction, the first electrodes and the second electrodes being disposed facing each other with an insulating layer interposed therebetween, a first electrode selection circuit configured to supply a drive signal to the first electrodes, and a detection circuit configured to detect capacitance generated between the first electrodes and the second electrodes due to the drive signal. The first electrode selection circuit has a first period for selecting all the first electrodes included in one detection unit and a second period for selecting some of the first electrodes included in the detection unit out of the first electrodes, the detection circuit comprises a voltage detector including a capacitance circuit capable of changing capacitance for each of the second electrodes, and the capacitance of the capacitance circuit is controlled to have different values between the first period and the second period.

A detection system according to an embodiment of the present disclosure includes a detecting device including a plurality of first electrodes extending in a first direction and a plurality of second electrodes extending in a second direction intersecting the first direction, the first electrodes and the second electrodes being disposed facing each other with an insulating layer interposed therebetween, a first electrode selection circuit configured to supply a drive signal to the first electrodes, and a detection circuit configured to detect capacitance generated between the first electrodes and the second electrodes due to the drive signal, and a fingerprint pattern generating device configured to generate a fingerprint pattern based on output from the detecting device. The first electrode selection circuit has a first period for selecting all the first electrodes included in one detection unit and a second period for selecting some of the first electrodes included in the detection unit out of the first electrodes, the detection circuit comprises a voltage detector including a capacitance circuit capable of changing capacitance for each of the second electrodes, and the capacitance of the capacitance circuit is controlled to have different values between the first period and the second period.

BRIEF DESCRIPTION OF THE DRAWINGS

FIG. 5 is a conceptual diagram of a specific example of fingerprint pattern generation according to the embodiment;

DETAILED DESCRIPTION

Figure 1:
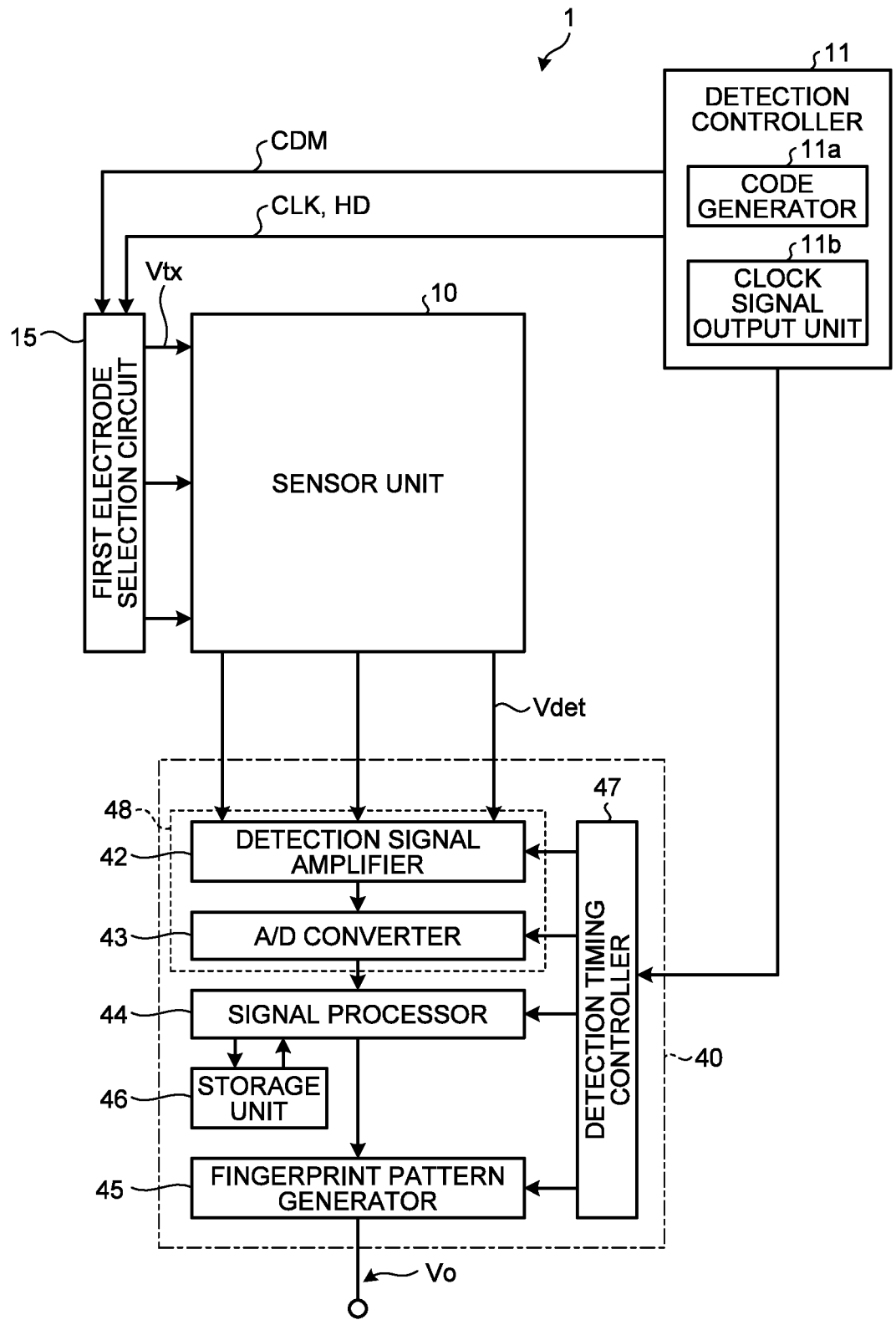
FIG. 1 is a block diagram of an example of the configuration of a detecting device according to an embodiment.

Exemplary aspects (embodiments) to embody the present disclosure are described below in greater detail with reference to the accompanying drawings. The contents described in the embodiments are not intended to limit the present disclosure. Components described below include components easily conceivable by those skilled in the art and components substantially identical therewith. Furthermore, the components described below may be appropriately combined. What is disclosed herein is given by way of example only, and appropriate modifications made without departing from the spirit of the present disclosure and easily conceivable by those skilled in the art naturally fall within the scope of the present disclosure. To simplify the explanation, the drawings may possibly illustrate the width, the thickness, the shape, and other elements of each unit more schematically than those in the actual aspect. These elements, however, are given by way of example only and are not intended to limit interpretation of the present disclosure. In the present specification and the drawings, components similar to those previously described with reference to previously discussed drawings are denoted by like reference numerals, and detailed explanation thereof may be appropriately omitted.

FIG. 1 is a block diagram of an example of the configuration of a detecting device according to an embodiment. As illustrated in FIG. 1, a detecting device 1 according to the embodiment includes a sensor unit 10, a detection controller 11, a first electrode selection circuit 15, and a detector 40.

Figure 2:
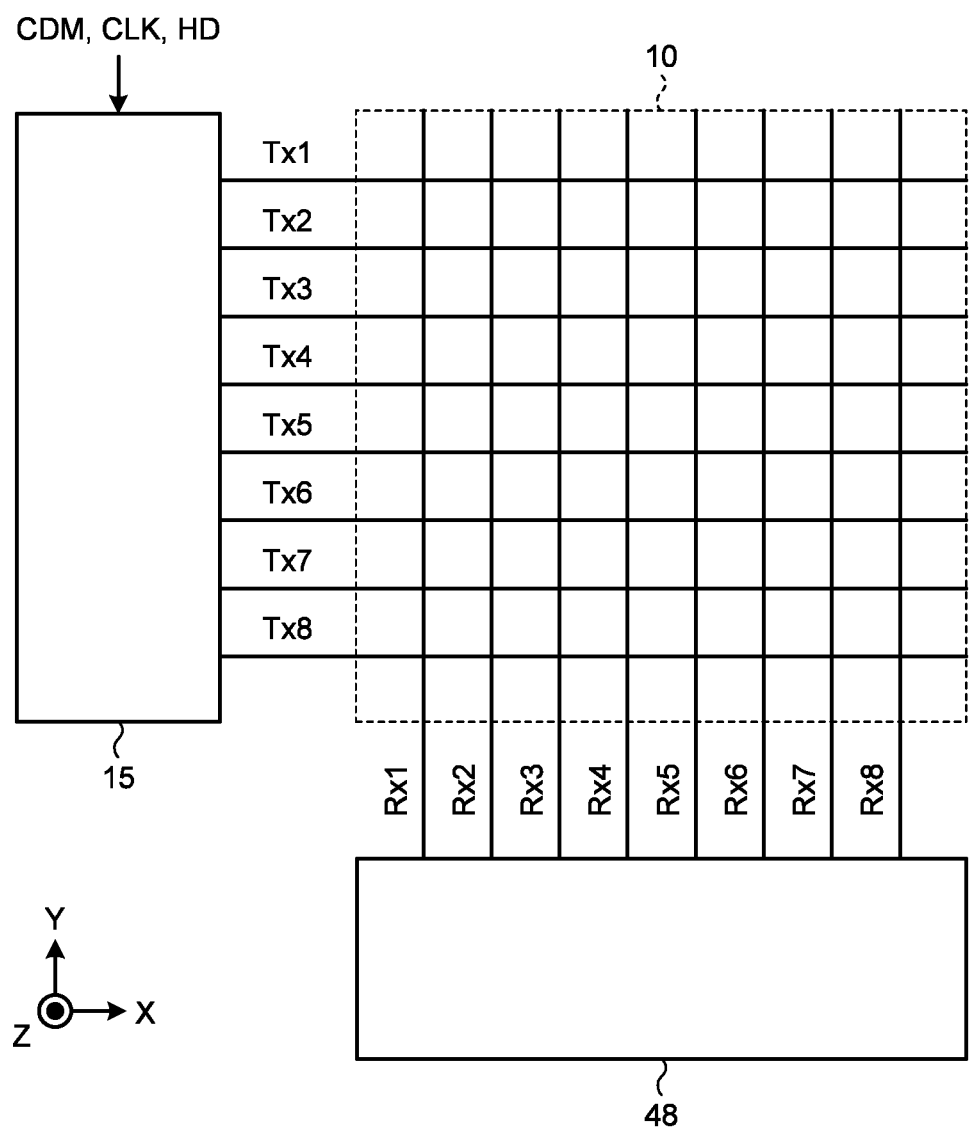
FIG. 2 is a schematic of the configuration of a sensor unit and a method for detecting a fingerprint pattern by the sensor unit.

FIG. 2 is a schematic of the configuration of the sensor unit and a method for detecting a fingerprint pattern by the sensor unit. The sensor unit 10 includes a plurality of first electrodes Tx and a plurality of second electrodes Rx. The first electrodes Tx extend in an X-direction and are arrayed in a Y-direction. The second electrodes Rx extend in the Y-direction and are arrayed in the X-direction. The first electrodes Tx and the second electrodes Rx face each other in a Z-direction in a non-contact state. The first electrodes Tx are coupled to the first electrode selection circuit 15. The second electrodes Rx are coupled to the detector 40.

While FIG. 2 illustrates an example where eight first electrodes Tx (Tx1, Tx2, . . . , and Tx8) and eight second electrodes Rx (Rx1, Rx2, . . . , and Rx8) are provided, the embodiment is not limited thereto. The number of first electrodes Tx and the number of second electrodes Rx can be an integer of 2 or larger and may be a multiple of 8, such as 64 and 128. The embodiment, for example, may have a plurality of regions each including a plurality of (eight in the example illustrated in FIG. 2) first electrodes Tx (Tx1, Tx2, . . . , and Tx8) and a plurality of (eight in the example illustrated in FIG. 2) second electrodes Rx (Rx1, Rx2, . . . , and Rx8) as one detection unit.

The sensor unit 10 performs detection based on drive signals Vtx supplied from the first electrode selection circuit 15 by code division multiplexing (CDM) drive.

The detection controller 11 is a circuit that supplies control signals to the first electrode selection circuit 15 and the detector 40 and controls their operations. The detection controller 11 includes a code generator 11a and a clock signal output unit 11b. The code generator 11a supplies the first electrode selection circuit 15 with a predetermined code signal CDM based on a predetermined code defined by the square matrix in the following Expression (1), for example. The order of the square matrix according to the present embodiment is 8 corresponding to the number of first electrodes Tx. The predetermined code is a code based on a square matrix the elements of which are either "1" or "−1" and any two different rows of which are an orthogonal matrix, that is, a code based on a Hadamard matrix, for example. Optionally, the predetermined code may be either "1" or "0". The clock signal output unit 11b supplies clock signals CLK and code switching signals HD to the first electrode selection circuit 15.

$$\begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix} \quad (1)$$

Figures 3, 4:
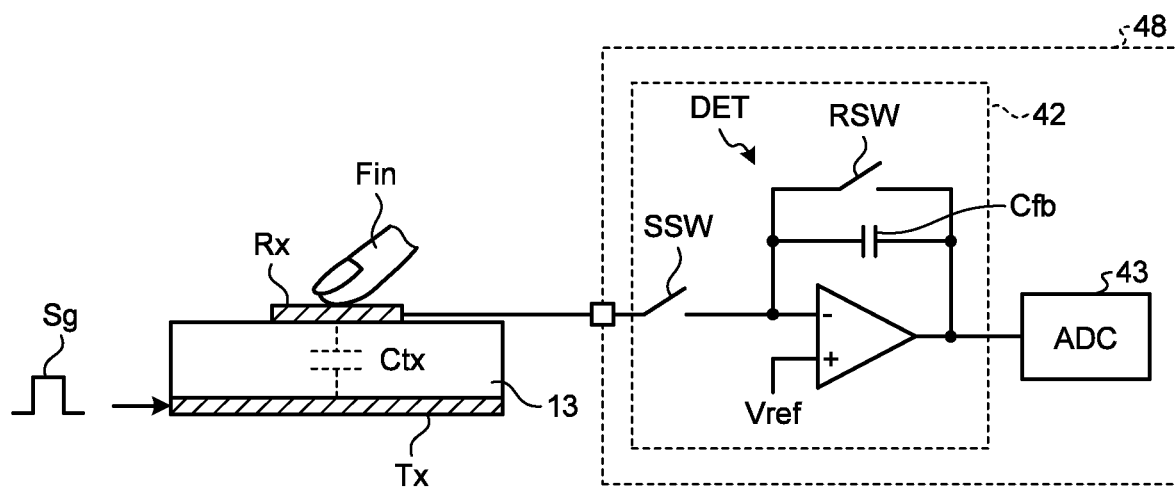
FIG. 3 is a diagram of an example of selection of first electrodes for each code signal.
FIG. 4 is a diagram for explaining detection control by a mutual capacitive system.

The first electrode selection circuit 15 selects the first electrodes Tx according to the code signal CDM based on the code switching signals HD for dividing one frame period into eight periods and outputs drive pulses synchronized with the clock signals CLK. FIG. 3 is a diagram of an example of selection of the first electrodes for each code signal.

Code signals CDM1, CDM2, . . . , and CDM8 are output in periods t1, t2, . . . , and t8, respectively, defined by the code switching signals HD. In FIG. 3, "1" represents selecting the first electrode Tx, and "0" represents not selecting the first electrode Tx. If the sensor unit 10 has an image display function, image display periods may be arranged between the periods t1, t2, . . . , and t8.

In the period t1 when the code signal CDM1 is output, all the first electrodes Tx (Tx1, Tx2, . . . , and Tx8) illustrated in FIG. 2 are selected. In the following description, the period t1 when all the first electrodes Tx (Tx1, Tx2, . . . , and Tx8) illustrated in FIG. 2 are selected is also referred to as a "first period".

In the period t2 when the code signal CDM2 is output, the first electrodes Tx1, Tx3, Tx5, and Tx7 are selected, and the first electrodes Tx2, Tx4, Tx6, and Tx8 are not selected.

In the period t3 when the code signal CDM3 is output, the first electrodes Tx1, Tx2, Tx5, and Tx6 are selected, and the first electrodes Tx3, Tx4, Tx7, and Tx8 are not selected.

In the period t4 when the code signal CDM4 is output, the first electrodes Tx1, Tx4, Tx5, and Tx8 are selected, and the first electrodes Tx2, Tx3, Tx6, and Tx7 are not selected.

In the period t5 when the code signal CDM5 is output, the first electrodes Tx1, Tx2, Tx3, and Tx4 are selected, and the first electrodes Tx5, Tx6, Tx7, and Tx8 are not selected.

In the period t6 when the code signal CDM6 is output, the first electrodes Tx1, Tx3, Tx6, and Tx8 are selected, and the first electrodes Tx2, Tx4, Tx5, and Tx7 are not selected.

In the period t7 when the code signal CDM7 is output, the first electrodes Tx1, Tx2, Tx7, and Tx8 are selected, and the first electrodes Tx3, Tx4, Tx5, and Tx6 are not selected.

In the period t8 when the code signal CDM8 is output, the first electrodes Tx1, Tx4, Tx6, and Tx7 are selected, and the first electrodes Tx2, Tx3, Tx5, and Tx8 are not selected.

In the following description, the periods t2, t3, . . . , and t8 when the code signals CDM2, CDM3, . . . , and CDM8 are output are also referred to as a "second period".

The detector 40 is a circuit that detects a fingerprint pattern based on the control signals supplied from the detection controller 11 and detection signals Vdet supplied from the sensor unit 10. The detector 40 includes a detection circuit 48, a signal processor 44, a fingerprint pattern generator 45, a storage unit 46, and a detection timing controller 47. The detection circuit 48 includes a detection signal amplifier 42 and an A/D converter 43.

The detection timing controller 47 controls the detection signal amplifier 42, the A/D converter 43, the signal processor 44, and the fingerprint pattern generator 45 such that they operate synchronously with one another based on the control signals supplied from the detection controller 11.

The sensor unit 10 supplies the detection signals Vdet to the detection circuit 48.

The detection signal amplifier 42 outputs signals Vout obtained by amplifying the detection signals Vdet supplied from the sensor unit 10. The A/D converter 43 converts analog signals output from the detection signal amplifier 42 into digital signals.

The signal processor 44 performs predetermined decoding on the signals Vout converted into digital signals.

The storage unit 46 temporarily stores therein data resulting from the decoding. The storage unit 46 may be a random access memory (RAM), a read only memory (ROM), or a register circuit, for example.

The fingerprint pattern generator 45 generates a fingerprint pattern based on the data resulting from the decoding and temporarily stored in the storage unit 46 and outputs the obtained fingerprint pattern as sensor output Vo.

The detecting device 1 performs capacitive detection control. The following describes detection control by a mutual capacitive system in the detecting device 1 according to the embodiment with reference to FIG. 4. FIG. 4 is a diagram for explaining detection control by the mutual capacitive system. FIG. 4 also illustrates the detection circuit 48. The detection circuit 48 includes a voltage detector DET for each of the second electrodes Rx. The voltage detector DET is provided to the detection signal amplifier 42. In other words, the detection signal amplifier 42 includes a plurality of voltage detectors DET corresponding to the respective second electrodes Rx.

As illustrated in FIG. 4, capacitance Ctx is formed by a pair of electrodes, that is, the first electrode Tx and the second electrode Rx, disposed facing each other with an insulating layer 13 interposed therebetween. The capacitance Ctx generates not only an electric field formed between the facing surfaces of the first electrode Tx and the second electrode Rx but also a fringe electric field extending from the ends of the first electrode Tx to the upper surface of the second electrode Rx. The insulating layer 13 can be composed of a single insulating film. Alternatively, the insulating layer 13 may be composed of a stack including a plurality of insulating films or a stack including a dielectric, an air layer, or a resin or glass substrate that supports the second electrode Rx, for example, in addition to these insulating films.

The drive signal supplied to the first electrode Tx is an AC square wave Sg at a predetermined frequency (e.g., a frequency of the order of several kilohertz to several hundred kilohertz), for example. An electric current corresponding to the capacitance Ctx flows through the voltage detector DET. The voltage detector DET converts fluctuations in electric current due to the AC square wave Sg into fluctuations in voltage.

The amplitude of a voltage signal output from the voltage detector DET becomes smaller as a finger Fin comes closer to the detection surface. The absolute value $|\Delta V|$ of the difference in voltage changes depending on the effects of an object to be detected in contact with or in proximity to the detection surface. The detector 40 determines recesses and protrusions or the like of the finger Fin based on the absolute value $|\Delta V|$. In this manner, the detecting device 1 can perform control for detecting a fingerprint pattern by the mutual capacitive system.

FIG. 5 is a conceptual diagram of a specific example of fingerprint pattern generation according to the embodiment.

In FIG. 5, the square matrix on the left of the left side represents data obtained in each of the periods t1, t2, . . . , and t8 defined by the code switching signals HD. For example, $D_{11}$ represents data obtained by the second electrode Rx1 in the period t1. For example, $D_{88}$ represents data obtained by the second electrode Rx8 in the period t8. In other words, data $D_{11}, D_{12}, \ldots,$ and $D_{18}$ represent a data row obtained by the second electrodes Rx1, Rx2, . . . , and Rx8, respectively, in the period t1, and data $D_{11}, D_{21}, \ldots,$ and $D_{81}$ represent a data column obtained by the second electrode Rx1 in the periods t1, t2, . . . , and t8, respectively. In the present disclosure, $D_{11}, D_{12}, \ldots, D_{87},$ and $D_{88}$ illustrated in FIG. 5 are data values resulting from a correcting operation, which will be described later. In FIG. 5, the square matrix on the right of the left side is the code based on the Hadamard matrix described above.

Figure 6:
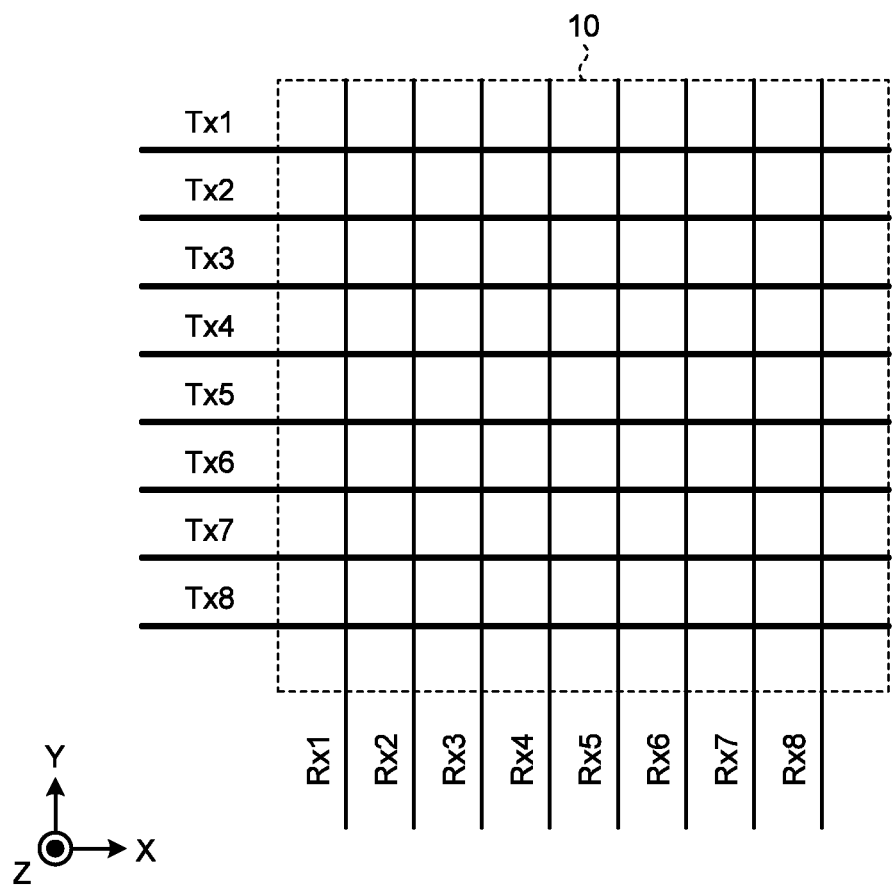
FIG. 6 is a diagram of a state of selecting the first electrodes in a first period.
Figure 7:
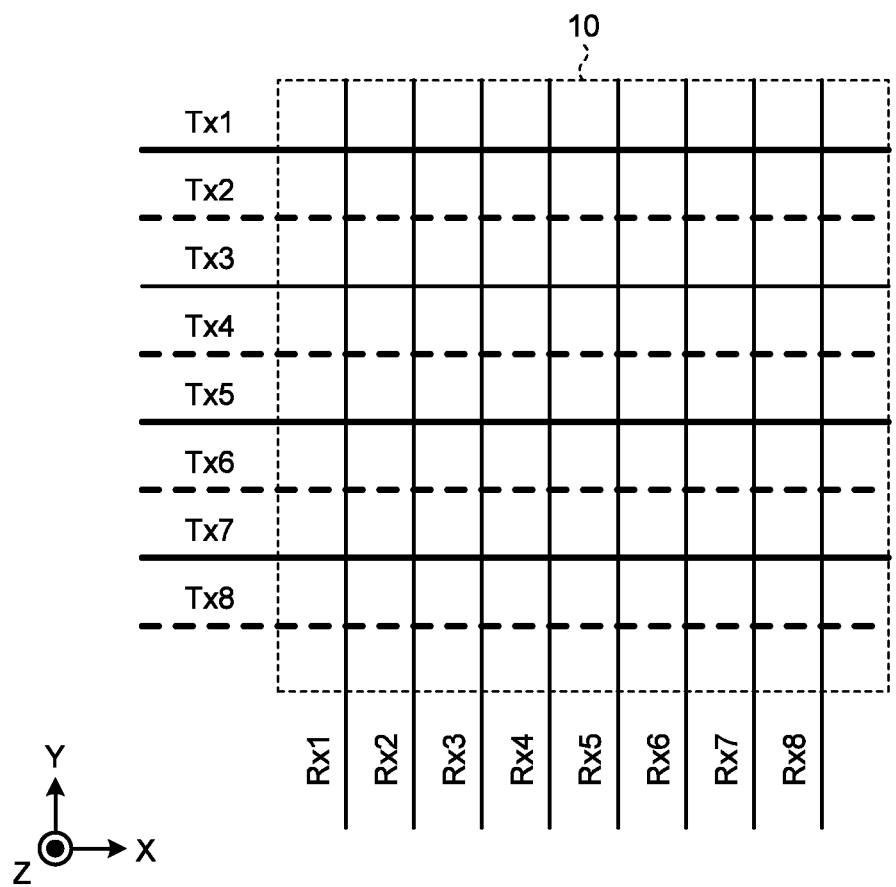
FIG. 7 is a diagram of a state of selecting the first electrodes in a second period.

FIG. 6 is a diagram of a state of selecting the first electrodes in the first period. FIG. 7 is a diagram of a state of selecting the first electrodes in the second period. In the examples illustrated in FIGS. 6 and 7, the selected first electrodes Tx are represented by solid lines, and the non-selected first electrodes Tx are represented by dashed lines. FIG. 7 illustrates a state of selecting the first electrodes Tx in the period t2 as an example of the second period.

In the first period illustrated in FIG. 6, the capacitance Ctx illustrated in FIG. 4 is larger than in the second period illustrated in FIG. 7. As a result, the detection signals Vdet supplied from the second electrodes Rx (Rx1, Rx2, . . . , and Rx8) to the detection circuit 48 in the first period may possibly be clipped. If the gain is reduced to prevent the detection signals Vdet supplied from the second electrodes Rx (Rx1, Rx2, . . . , and Rx8) to the detection circuit 48 in the first period from being clipped, the detection signals Vdet supplied from the second electrode Rx (Rx1, Rx2, . . . , Rx8) to the detection circuit 48 in the second period (t2, t3, . . . , and t8) other than the first period (period t1) may possibly be made small, thereby reducing the detection accuracy.

In the present disclosure, the gain of the voltage detector DET illustrated in FIG. 4 between the first period (period t1) and the second period (periods t2, t3, . . . , and t8) other than the first period (period t1) is varied. Specifically, the detecting device 1 makes the gain of the voltage detector DET smaller in the first period (period t1) when the capacitance value of the capacitance Ctx is large than in the second period (period t2, t3, . . . , and t8) other than the first period (period t1). Consequently, the detecting device 1 can suppress clipping of the detection signals Vdet supplied from the second electrodes Rx (Rx1, Rx2, . . . , and Rx8) to the detection circuit 48 in the first period.

First Embodiment

Figure 8:
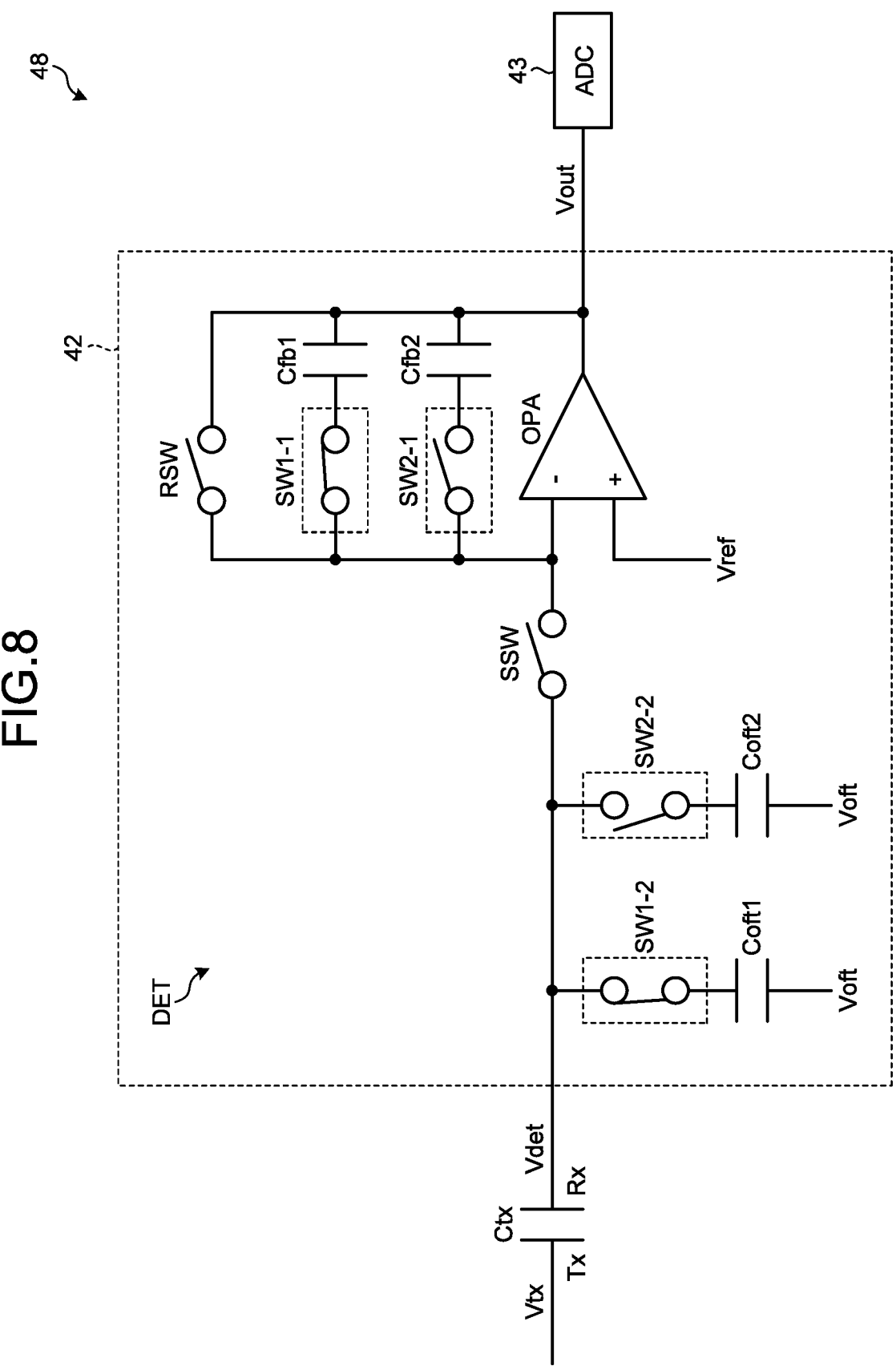
FIG. 8 is a diagram of an example of the configuration of a voltage detector according to a first embodiment.

FIG. 8 is a diagram of an example of the configuration of the voltage detector according to a first embodiment. In the detection signal amplifier 42 of the detection circuit 48 according to the first embodiment, the voltage detector DET is provided for each capacitance Ctx, that is, for each of the second electrodes Rx (Rx1, Rx2, ..., and Rx8). Specifically, eight voltage detectors DET corresponding to the respective eight second electrodes Rx (Rx1, Rx2, ..., and Rx8) are provided in the present disclosure.

As illustrated in FIG. 8, the voltage detector DET according to the present embodiment includes an operational amplifier OPA, a reset switch RSW, a selection switch SSW, switches SW1-1, SW1-2, SW2-1, and SW2-2, first feedback capacitance Cfb1, second feedback capacitance Cfb2, first offset capacitance Coft1, and second offset capacitance Coft2. The first feedback capacitance Cfb1, the second feedback capacitance Cfb2, the first offset capacitance Coft1, and the second offset capacitance Coft2 correspond to a "capacitance circuit" according to the present disclosure. The reset switch RSW and the selection switch SSW are switches controlled in detection control by the mutual capacitive system illustrated in FIG. 4. The reset switch RSW, the selection switch SSW, and the switches SW1-1, SW1-2, SW2-1, and SW2-2 are controlled by the detection timing controller 47 based on the control signals supplied from the detection controller 11. To simplify the explanation, the present disclosure does not describe the operations of the reset switch RSW and the selection switch SSW controlled in detection control by the mutual capacitive system.

A non-inverting input terminal (+) of the operational amplifier OPA receives a reference potential Vref. The first feedback capacitance Cfb1 is provided between the output of the operational amplifier OPA and an inverting input terminal (−) via the switch SW1-1. The output of the operational amplifier OPA is coupled to the A/D converter 43.

The second feedback capacitance Cfb2 is provided between the output of the operational amplifier OPA and the inverting input terminal (−) via the switch SW2-1.

The inverting input terminal (−) of the operational amplifier OPA is coupled to the capacitance Ctx (second electrode Rx) via the selection switch SSW. The capacitance Ctx (second electrode Rx) is coupled to the first offset capacitance Coft1 via the switch SW1-2. One end of the first offset capacitance Coft1 receives an offset potential Voft.

The capacitance Ctx (second electrode Rx) is coupled to the second offset capacitance Coft2 via the switch SW2-2. One end of the second offset capacitance Coft2 receives the offset potential Voft.

Figure 9:
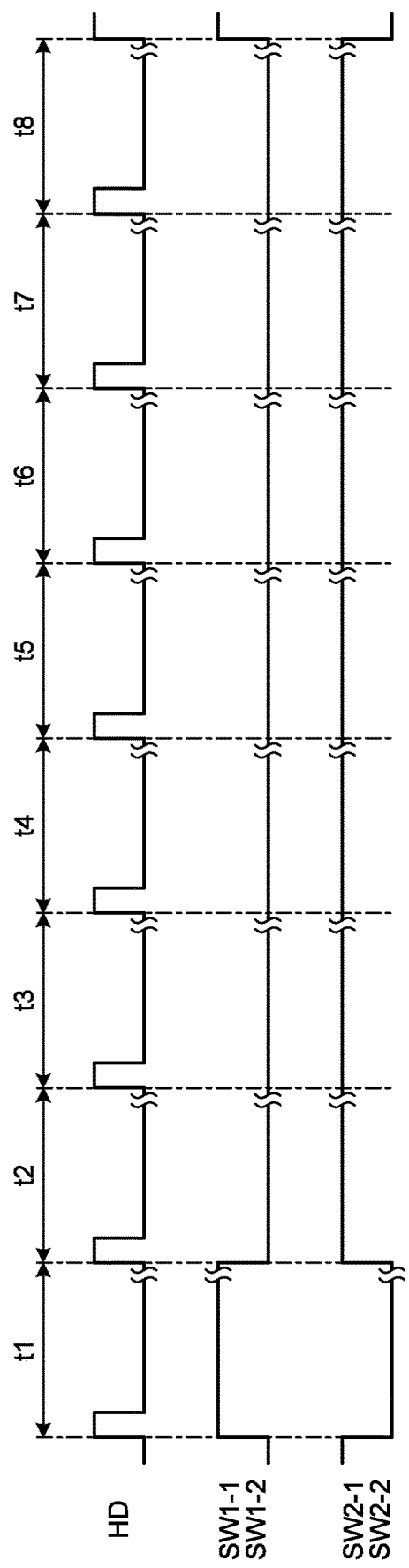
FIG. 9 is a timing chart illustrating switching operations of the voltage detector according to the first embodiment.

FIG. 9 is a timing chart illustrating switching operations of the voltage detector according to the first embodiment. If the sensor unit 10 has an image display function, image display periods may be arranged between the periods as described above.

In the period t1 (first period), the switches SW1-1 and SW1-2 according to the first embodiment are controlled to be turned on, and the switches SW2-1 and SW2-2 are controlled to be turned off as illustrated in FIG. 9. As a result, the first feedback capacitance Cfb1 is coupled between the output of the operational amplifier OPA and the inverting input terminal (−), and the first offset capacitance Coft1 is coupled to the capacitance Ctx. In the periods t2, t3, ..., and t8 (second period) other than the period t1 (first period), the switches SW1-1 and SW1-2 according to the first embodiment are controlled to be turned off, and the switches SW2-1 and SW2-2 are controlled to be turned on as illustrated in FIG. 9. As a result, the second feedback capacitance Cfb2 is coupled between the output of the operational amplifier OPA and the inverting input terminal (−), and the second offset capacitance Coft2 is coupled to the capacitance Ctx.

In the configuration according to the first embodiment described above, the magnitude relation between the first feedback capacitance Cfb1 and the second feedback capacitance Cfb2 is expressed by the following Expression (2):

$$Cfb1 > Cfb2 \tag{2}$$

In the configuration according to the first embodiment described above, the magnitude relation between the first offset capacitance Coft1 and the second offset capacitance Coft2 is expressed by the following Expression (3):

$$Coft1 > Coft2 \tag{3}$$

Therefore, the detecting device 1 can reduce the values of the detection signals Vdet supplied from the second electrodes Rx (Rx1, Rx2, ..., and Rx8) to the detection circuit 48 in the period t1 (first period).

In the configuration described above, the signal processor 44 performs a correcting operation on a data value D1 obtained in the period t1 (first period) and a data value D2 obtained in the periods t2, t3, ..., and t8 (second period) other than the period t1 (first period).

Capacitance Ctx1, the first feedback capacitance Cfb1, the first offset capacitance Coft1, the drive signal Vtx, and an output signal Vout1 of the voltage detector DET in the period t1 (first period) are expressed by the following Expression (4):

$$Vout1 = (Ctx1/Cfb1) \times Vtx - (Coft1/Cfb1) \times Voft \tag{4}$$

Expression (4) can be transformed into the following Expression (5):

$$Ctx1 = (Vout1/Vtx) \times Cfb1 + (Voft/Vtx) \times Coft1 \tag{5}$$

The data value D1 obtained in the period t1 (first period) is proportional to the output signal Vout1 of the voltage detector DET. Expression (5) is expressed by the following Expression (6) using a first proportional coefficient k1.

$$Ctx1 = (k1 \times D1/Vtx) \times Cfb1 + (Voft/Vtx) \times Coft1 \tag{6}$$

A data value D1' resulting from the correcting operation is proportional to the capacitance Ctx1. Expression (6) is expressed by the following Expression (7) using a second proportional coefficient k2.

$$k2 \times D1' = (k1 \times D1/Vtx) \times Cfb1 + (Voft/Vtx) \times Coft1 \tag{7}$$

By transforming Expression (7), the data value D1' resulting from the correcting operation is expressed by the following Expression (8):

$$D1' = D1 \times (Cfb1/Vtx) \times (k1/k2) + (Voft/Vtx) \times Coft1 \times 1/k2 \tag{8}$$

Capacitance Ctx2, the second feedback capacitance Cfb2, the second offset capacitance Coft2, the drive signal Vtx, and an output signal Vout2 of the voltage detector DET in the periods t2, t3, ..., and t8 (second period) other than the period t1 (first period) are expressed by the following Expression (9):

$$Vout2 = (Ctx2/Cfb2) \times Vtx - (Coft2/Cfb2) \times Voft \tag{9}$$

Expression (9) can be transformed into the following Expression (10):

$$Ctx2 = (Vout2/Vtx) \times Cfb2 + (Voft/Vtx) \times Coft2 \tag{10}$$

The data value D2 obtained in the periods t2, t3, ..., and t8 (second period) other than the period t1 (first period) is proportional to the output signal Vout2 of the voltage detector DET. Expression (10) is expressed by the following Expression (11) using the first proportional coefficient k1.

$$Ctx2 = (k1 \times D1/Vtx) \times Cfb2 + (Voft/Vtx) \times Coft2 \tag{11}$$

A data value D2' resulting from the correcting operation is proportional to the capacitance Ctx2. Expression (11) is expressed by the following Expression (12) using the second proportional coefficient k2.

$$k2 \times D2' = (k1 \times D2/Vtx) \times Cfb2 + (Voft/Vtx) \times Coft2 \quad (12)$$

By transforming Expression (12), the data value D2' resulting from the correcting operation is expressed by the following Expression (13):

$$D2' = D2 \times (Cfb2/Vtx) \times (k1/k2) + (Voft/Vtx) \times Coft2 \times 1/k2 \quad (13)$$

The first feedback capacitance Cfb1, the second feedback capacitance Cfb2, the first offset capacitance Coft1, the second offset capacitance Coft2, the first proportional coefficient k1, and the second proportional coefficient k2 are set such that the data value D1' resulting from the correcting operation expressed by Expression (8) is equivalent to the data value D2' resulting from the correcting operation expressed by Expression (13). Coefficients a, b, c, and d expressed by the following Expressions (14), (15), (16), and (17) are stored in advance.

$$a = (Cfb1/Vtx) \times (k1/k2) \quad (14)$$

$$b = Coft1 \times (Voft/Vtx) \times 1/k2 \quad (15)$$

$$c = (Cfb2/Vtx) \times (k1/k2) \quad (16)$$

$$d = Coft2 \times (Voft/Vtx) \times 1/k2 \quad (17)$$

The signal processor 44 performs the correcting operation on the data value D1 obtained in the period t1 (first period) by the following Expression (18) using the coefficients a and b expressed by Expressions (14) and (15).

$$D1' = D1 \times a + b \quad (18)$$

The signal processor 44 performs the correcting operation on the data value D2 obtained in the periods t2, t3, . . . , and t8 (second period) other than the period t1 (first period) by the following Expression (19) using the coefficients c and d expressed by Expressions (16) and (17).

$$D2' = D2 \times c + d \quad (19)$$

As a result, the detecting device 1 can perform the fingerprint pattern generation illustrated in FIG. 5 using the data value D1' resulting from the correcting operation obtained in the period t1 (first period) and the data value D2' resulting from the correcting operation obtained in the periods t2, t3, . . . , and t8 (second period) other than the period t1 (first period).

With the configuration and the operations described above, the detecting device 1 according to the first embodiment can reduce the values of the detection signals Vdet supplied from the second electrodes Rx (Rx1, Rx2, . . . , and Rx8) to the detection circuit 48 in the period t1 (first period). Consequently, the present embodiment can achieve excellent fingerprint detection using the data obtained in the period t1 (first period) and the periods t2, t3, t4, t5, t6, t7, and t8 (second period).

Modifications

Figure 10:
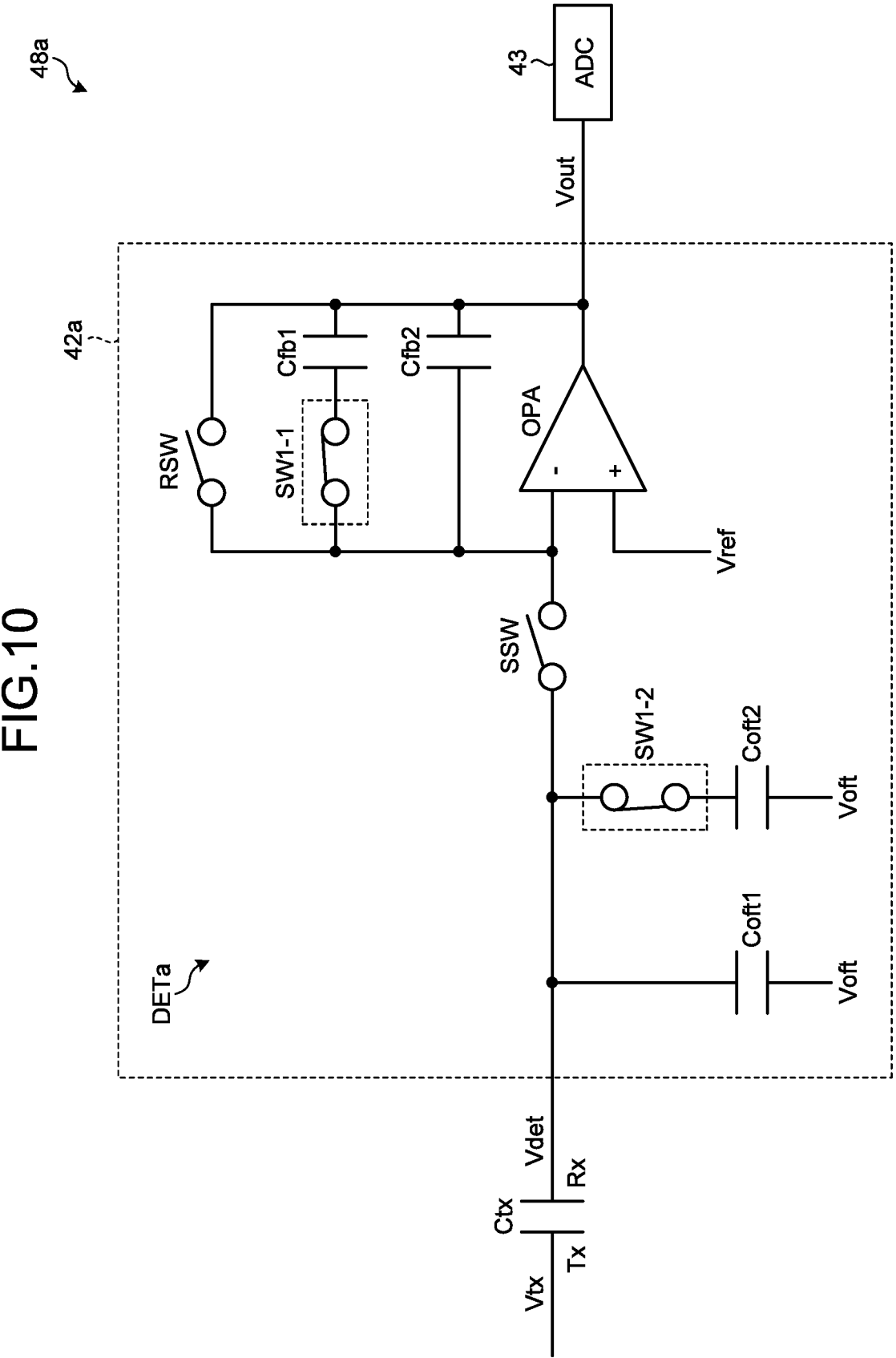
FIG. 10 is a diagram of an example of the configuration of the voltage detector according to a modification of the first embodiment.

FIG. 10 is a diagram of an example of the configuration of the voltage detector according to a modification of the first embodiment. In the following description, the same components as those described in the first embodiment are denoted by like reference numerals, and overlapping explanation thereof is omitted. The following describes differences from the first embodiment.

In a detection signal amplifier 42a of a detection circuit 48a according to a modification of the first embodiment, a voltage detector DETa is provided for each capacitance Ctx, that is, for each of the second electrodes Rx (Rx1, Rx2, . . . , and Rx8) similarly to the first embodiment. Specifically, eight voltage detectors DETa corresponding to the respective eight second electrodes Rx (Rx1, Rx2, . . . , and Rx8) are provided in the present disclosure.

As illustrated in FIG. 10, the voltage detector DETa according to the present embodiment includes the operational amplifier OPA, the reset switch RSW, the selection switch SSW, the switches SW1-1 and SW1-2, the first feedback capacitance Cfb1, the second feedback capacitance Cfb2, the first offset capacitance Coft1, and the second offset capacitance Coft2. The first feedback capacitance Cfb1, the second feedback capacitance Cfb2, the first offset capacitance Coft1, and the second offset capacitance Coft2 correspond to the "capacitance circuit" according to the present disclosure.

The non-inverting input terminal (+) of the operational amplifier OPA receives the reference potential Vref. The first feedback capacitance Cfb1 is provided between the output of the operational amplifier OPA and the inverting input terminal (−) via the switch SW1-1.

The second feedback capacitance Cfb2 is provided between the output of the operational amplifier OPA and the inverting input terminal (−).

The inverting input terminal (−) of the operational amplifier OPA is coupled to the capacitance Ctx (second electrode Rx) via the selection switch SSW. The capacitance Ctx (second electrode Rx) is coupled to the first offset capacitance Coft1 via the switch 1-2. One end of the first offset capacitance Coft1 receives the offset potential Voft.

The capacitance Ctx (second electrode Rx) is coupled to the second offset capacitance Coft2. One end of the second offset capacitance Coft2 receives the offset potential Voft.

Figure 11:
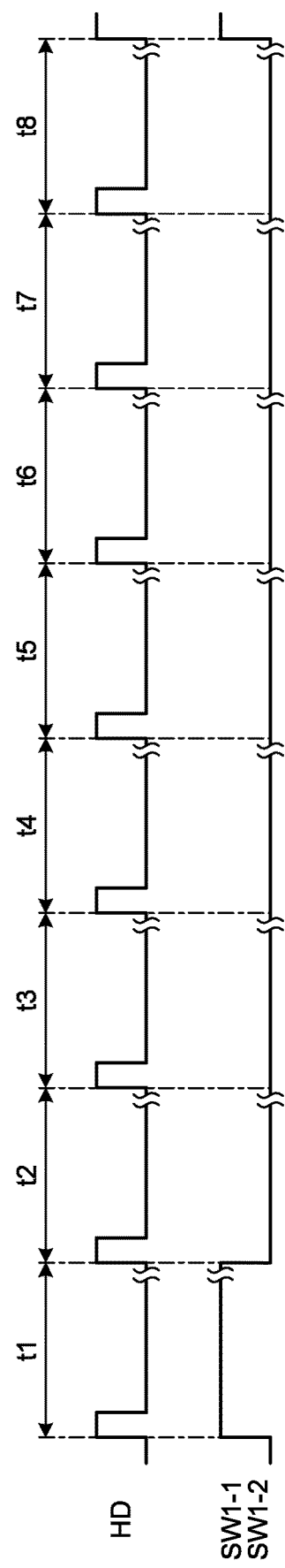
FIG. 11 is a timing chart of switching operations of the voltage detector according to the modification of the first embodiment.

FIG. 11 is a timing chart of switching operations of the voltage detector according to the modification of the first embodiment.

In the period t1 (first period), the switches SW1-1 and SW1-2 according to the modification of the first embodiment are controlled to be turned on as illustrated in FIG. 11. As a result, the first feedback capacitance Cfb1 and the second feedback capacitance Cfb2 are coupled between the output of the operational amplifier OPA and the inverting input terminal (−), and the first offset capacitance Coft1 and the second feedback capacitance Cfb2 are coupled to the capacitance Ctx. In the periods t2, t3, . . . , and t8 (second period) other than the period t1 (first period), the switches SW1-1 and SW1-2 according to the modification of the first embodiment are controlled to be turned off as illustrated in FIG. 11. As a result, the second feedback capacitance Cfb2 is coupled between the output of the operational amplifier OPA and the inverting input terminal (−), and the second offset capacitance Coft2 is coupled to the capacitance Ctx.

Therefore, the feedback capacitance coupled between the output of the operational amplifier OPA and the inverting input terminal (−) in the period t1 (first period) corresponds to the combined capacitance of the first feedback capacitance Cfb1 and the second feedback capacitance Cfb2, and the offset capacitance coupled to the capacitance Ctx corresponds to the combined capacitance of the first offset capacitance Coft1 and the second feedback capacitance Cfb2. Consequently, the detecting device 1 can reduce the values of the detection signals Vdet supplied from the second electrodes Rx (Rx1, Rx2, . . . , and Rx8) to the detection circuit 48 in the period t1 (first period).

Second Embodiment

Figure 12:
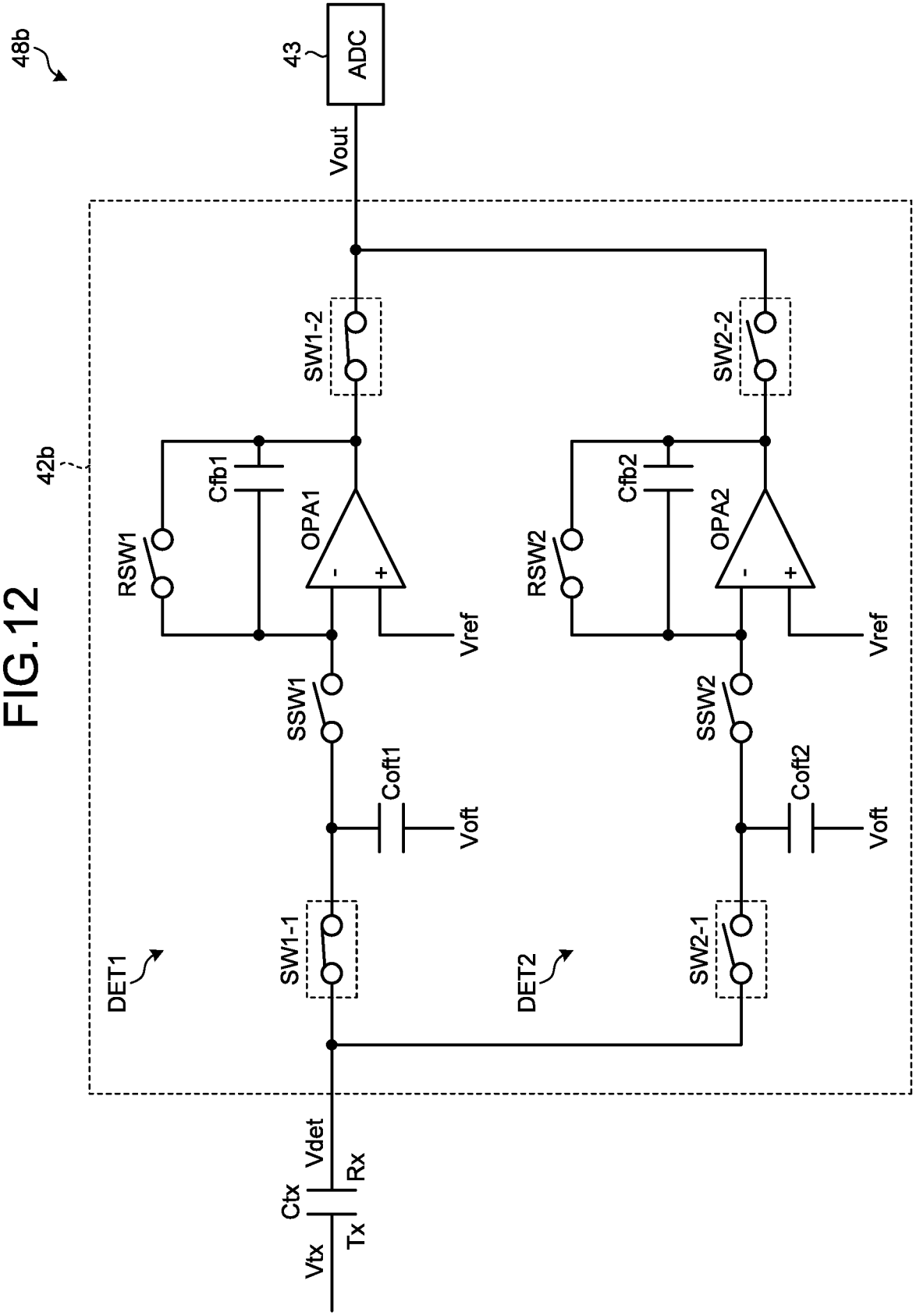
FIG. 12 is a diagram of an example of the configuration of the voltage detector according to a second embodiment.

FIG. 12 is a diagram of an example of the configuration of the voltage detector according to a second embodiment.

In the following description, the same components as those described in the first embodiment are denoted by like reference numerals, and overlapping explanation thereof is omitted. The following describes differences from the first embodiment.

In a detection signal amplifier 42b of a detection circuit 48b according to the second embodiment, two voltage detectors of a first voltage detector DET1 and a second voltage detector DET2 are provided in parallel for each capacitance Ctx, that is, for each of the second electrodes Rx (Rx1, Rx2, . . . , and Rx8). Specifically, eight first voltage detectors DET1 and eight second voltage detectors DET2 corresponding to the eight second electrodes Rx (Rx1, Rx2, . . . , and Rx8) are provided in the present disclosure.

As illustrated in FIG. 12, the first voltage detector DET1 according to the present embodiment includes a first operational amplifier OPA1, a reset switch RSW1, a selection switch SSW1, the switches SW1-1 and SW1-2, the first feedback capacitance Cfb1, and the first offset capacitance Coft1. The first feedback capacitance Cfb1 and the first offset capacitance Coft1 correspond to the "capacitance circuit" according to the present disclosure.

The non-inverting input terminal (+) of the first operational amplifier OPA1 receives the reference potential Vref. The first feedback capacitance Cfb1 is provided between the output of the first operational amplifier OPA1 and the inverting input terminal (−). The output of the first operational amplifier OPA1 is coupled to the A/D converter 43 via the switch SW1-2.

The inverting input terminal (−) of the first operational amplifier OPA1 is coupled to the capacitance Ctx (second electrode Rx) via the selection switch SSW1 and the switch SW1-1. The capacitance Ctx (second electrode Rx) is coupled to the first offset capacitance Coft1 via the switch 1-1. One end of the first offset capacitance Coft1 receives the offset potential Voft.

As illustrated in FIG. 12, the second voltage detector DET2 according to the present embodiment includes a second operational amplifier OPA2, a reset switch RSW2, a selection switch SSW2, the switches SW2-1 and SW2-2, the second feedback capacitance Cfb2, and the second offset capacitance Coft2. The second feedback capacitance Cfb2 and the second offset capacitance Coft2 correspond to the "capacitance circuit" according to the present disclosure.

The non-inverting input terminal (+) of the second operational amplifier OPA2 receives the reference potential Vref. The second feedback capacitance Cfb2 is provided between the output of the second operational amplifier OPA2 and the inverting input terminal (−). The output of the second operational amplifier OPA2 is coupled to the A/D converter 43 via the switch SW2-2.

The inverting input terminal (−) of the second operational amplifier OPA2 is coupled to the capacitance Ctx (second electrode Rx) via the selection switch SSW2 and the switch SW2-1. The capacitance Ctx (second electrode Rx) is coupled to the second offset capacitance Coft2 via the switch 2-1. One end of the second offset capacitance Coft2 receives the offset potential Voft.

Figure 13:
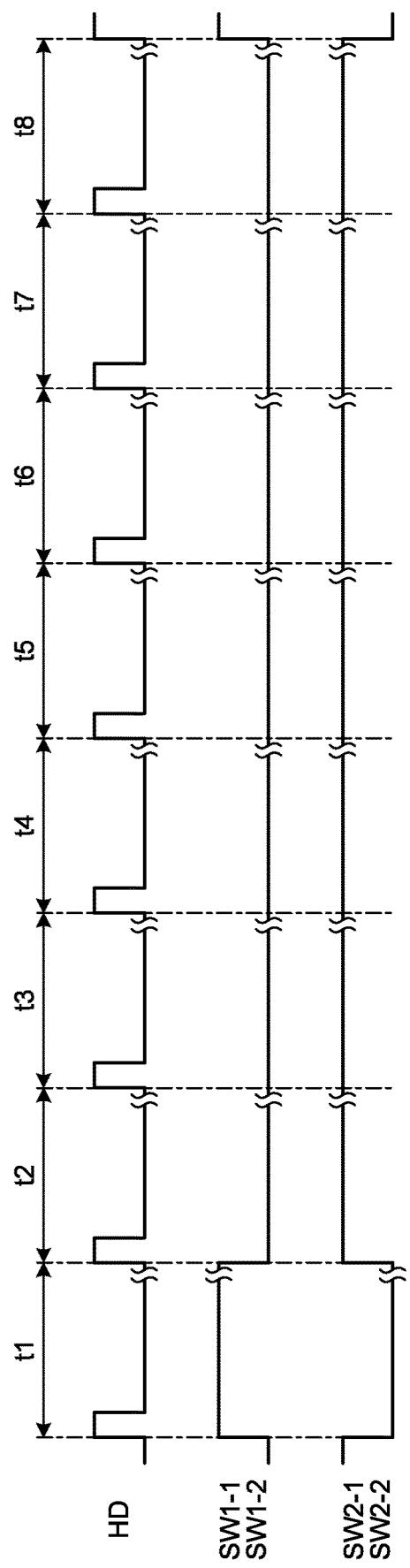
FIG. 13 is a timing chart illustrating switching operations of the voltage detector according to the second embodiment.

FIG. 13 is a timing chart illustrating switching operations of the voltage detector according to the second embodiment.

In the period t1 (first period), the switches SW1-1 and SW1-2 according to the second embodiment are controlled to be turned on, and the switches SW2-1 and SW2-2 are controlled to be turned off as illustrated in FIG. 13. As a result, the first voltage detector DET1 is coupled between the capacitance Ctx (second electrode Rx) and the A/D converter 43. In the periods t2, t3, . . . , and t8 (second period) other than the period t1 (first period), the switches SW1-1 and SW1-2 according to the second embodiment are controlled to be turned off, and the switches SW2-1 and SW2-2 are controlled to be turned on as illustrated in FIG. 13. As a result, the second voltage detector DET2 is coupled between the capacitance Ctx (second electrode Rx) and the A/D converter 43.

In the configuration according to the second embodiment described above, the magnitude relation between the first feedback capacitance Cfb1 and the second feedback capacitance Cfb2 is expressed by Expression (2) similarly to the first embodiment. The magnitude relation between the first offset capacitance Coft1 and the second offset capacitance Coft2 is expressed by Expression (3) similarly to the first embodiment.

Consequently, similarly to the first embodiment, the detecting device 1 can reduce the values of the detection signals Vdet supplied from the second electrodes Rx (Rx1, Rx2, . . . , and Rx8) to the detection circuit 48 in the period t1 (first period).

Figure 14:
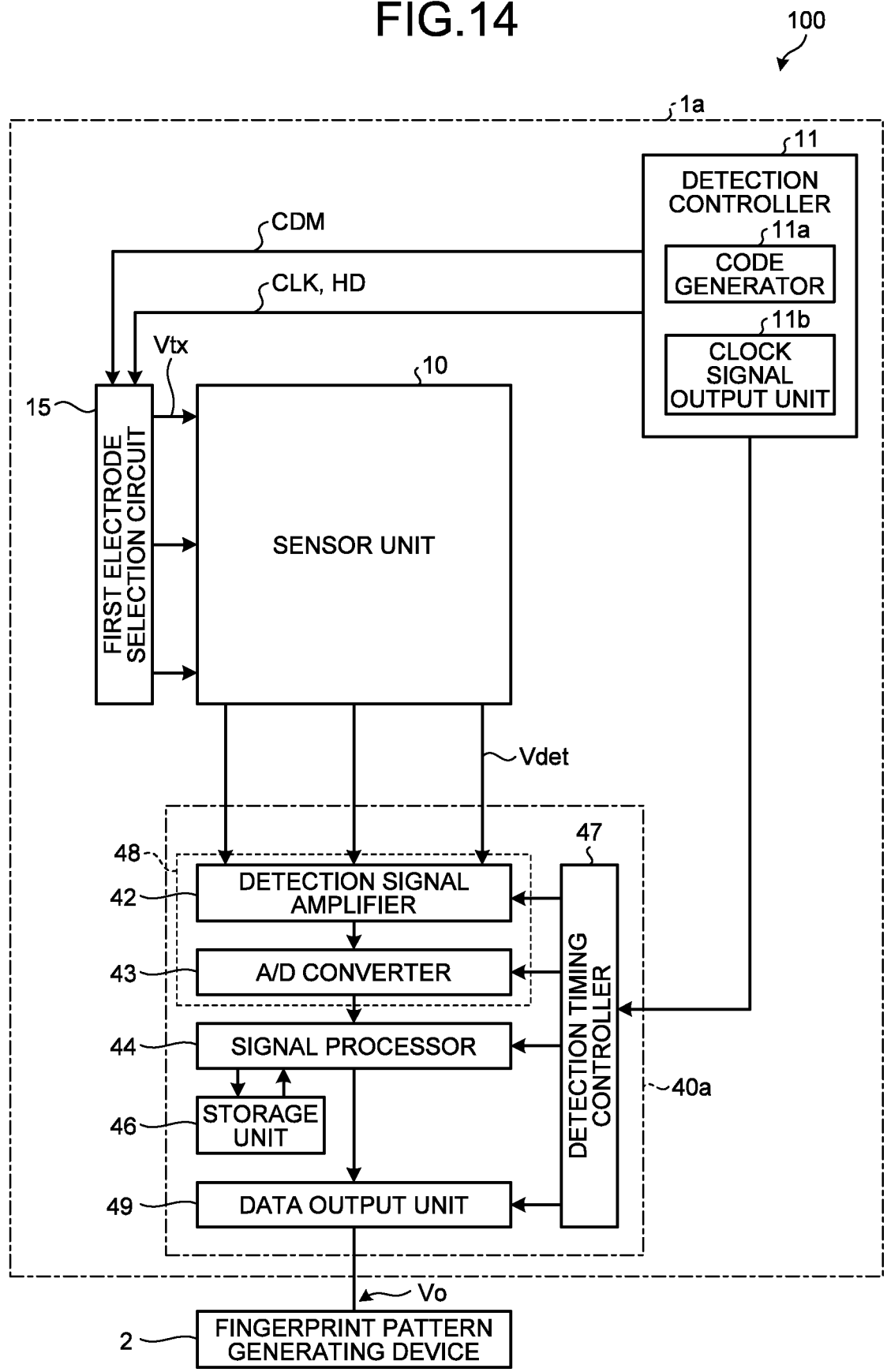
FIG. 14 is a block diagram of an example of the configuration of a detection system according to the embodiment.

FIG. 14 is a block diagram of an example of the configuration of a detection system according to the embodiment. The same components as those of the detecting device 1 illustrated in FIG. 1 are denoted by like reference numerals, and detailed explanation thereof is omitted.

As illustrated in FIG. 14, a detection system 100 according to the embodiment includes a detecting device 1a and a fingerprint pattern generating device 2. The detecting device 1a includes the sensor unit 10, the detection controller 11, the first electrode selection circuit 15, and a detector 40a.

In the detection system 100 illustrated in FIG. 14, a detection timing controller 47a of the detecting device 1a controls the detection signal amplifier 42, the A/D converter 43, the signal processor 44, and a data output unit 49 such that they operate synchronously with one another based on the control signals supplied from the detection controller 11. The data output unit 49 outputs data resulting from decoding and temporarily stored in the storage unit 46 to the fingerprint pattern generating device 2 as the sensor output Vo. The fingerprint pattern generating device 2 generates a fingerprint pattern by the fingerprint pattern generation illustrated in FIG. 5 based on the sensor output Vo output from the detector 40a.

Similarly to the detecting device 1 illustrated in FIG. 1, the detection system 100 according to the embodiment illustrated in FIG. 14 can also reduce the values of the detection signals Vdet supplied from the second electrodes Rx (Rx1, Rx2, . . . , and Rx8) to the detection circuit 48 in the period t1 (first period). Consequently, the present embodiment can achieve excellent fingerprint detection using the data obtained in the period t1 (first period) and the periods t2, t3, t4, t5, t6, t7, and t8 (second period).

While exemplary embodiments according to the present disclosure have been described, the embodiments are not intended to limit the disclosure. The contents disclosed in the embodiments are given by way of example only, and various modifications may be made without departing from the spirit of the present disclosure. Appropriate modifications made without departing from the spirit of the present disclosure naturally fall within the technical scope of the disclosure. At least one of the various omissions, substitutions, and modifications of the components may be made without departing from the gist of the embodiments above and the modifications thereof.

What is claimed is:

1. A detecting device comprising:
a plurality of first electrodes extending in a first direction and a plurality of second electrodes extending in a second direction intersecting the first direction, the first electrodes and the second electrodes being disposed facing each other with an insulating layer interposed therebetween;
a first electrode selection circuit configured to supply a drive signal to the first electrodes; and
a detection circuit configured to detect capacitance generated between the first electrodes and the second electrodes due to the drive signal, wherein
the first electrode selection circuit has a first period for selecting all the first electrodes included in one detection unit and a second period for selecting some of the first electrodes included in the detection unit out of the first electrodes,
the detection circuit comprises a voltage detector including a capacitance circuit capable of changing capacitance for each of the second electrodes,
the capacitance of the capacitance circuit is controlled to have different values between the first period and the second period,
the detection circuit comprises the voltage detector for each of the second electrodes,
the voltage detector includes an operational amplifier having a non-inverting input terminal configured to receive a reference potential and an inverting input terminal coupled to the second electrode, and
the capacitance circuit comprises:
first feedback capacitance coupled between an output of the operational amplifier and the inverting input terminal in the first period and cut off in the second period;
first offset capacitance having a first end configured to receive an offset potential and a second end coupled to the second electrode in the first period and cut off in the second period;
second feedback capacitance coupled between the output of the operational amplifier and the inverting input terminal in the second period and cut off in the first period; and
second offset capacitance having a first end configured to receive the offset potential and a second end coupled to the second electrode in the second period and cut off in the first period.

2. The detecting device according to claim 1, wherein the detection circuit is controlled such that the capacitance of the capacitance circuit has a larger value in the first period than in the second period.

3. A detecting device comprising:
a plurality of first electrodes extending in a first direction and a plurality of second electrodes extending in a second direction intersecting the first direction, the first electrodes and the second electrodes being disposed facing each other with an insulating layer interposed therebetween;
a first electrode selection circuit configured to supply a drive signal to the first electrodes; and
a detection circuit configured to detect capacitance generated between the first electrodes and the second electrodes due to the drive signal, wherein
the first electrode selection circuit has a first period for selecting all the first electrodes included in one detection unit and a second period for selecting some of the first electrodes included in the detection unit out of the first electrodes,
the detection circuit comprises a voltage detector including a capacitance circuit capable of changing capacitance for each of the second electrodes,
the capacitance of the capacitance circuit is controlled to have different values between the first period and the second period,
the detection circuit comprises the voltage detector for each of the second electrodes,
the voltage detector includes an operational amplifier having a non-inverting input terminal configured to receive a reference potential and an inverting input terminal coupled to the second electrode, and
the capacitance circuit comprises:
first feedback capacitance always coupled between an output of the operational amplifier and the inverting input terminal;
second feedback capacitance coupled in parallel with the first feedback capacitance in the first period and cut off in the second period;
first offset capacitance having a first end configured to receive an offset potential and a second end always coupled to the second electrode; and
second offset capacitance coupled in parallel with the first offset capacitance in the first period and cut off in the second period.

4. The detecting device according to claim 3, wherein the detection circuit is controlled such that the capacitance of the capacitance circuit has a larger value in the first period than in the second period.

5. A detecting device comprising:
a plurality of first electrodes extending in a first direction and a plurality of second electrodes extending in a second direction intersecting the first direction, the first electrodes and the second electrodes being disposed facing each other with an insulating layer interposed therebetween;
a first electrode selection circuit configured to supply a drive signal to the first electrodes; and
a detection circuit configured to detect capacitance generated between the first electrodes and the second electrodes due to the drive signal, wherein
the first electrode selection circuit has a first period for selecting all the first electrodes included in one detection unit and a second period for selecting some of the first electrodes included in the detection unit out of the first electrodes,
the detection circuit comprises a voltage detector including a capacitance circuit capable of changing capacitance for each of the second electrodes,
the capacitance of the capacitance circuit is controlled to have different values between the first period and the second period,
the detection circuit comprises a first voltage detector coupled in the first period and cut off in the second period and a second voltage detector coupled in the second period and cut off in the first period for each of the second electrodes,
the first voltage detector includes a first operational amplifier having a non-inverting input terminal configured to receive a reference potential and an inverting input terminal coupled to the second electrode,
the second voltage detector includes a second operational amplifier having a non-inverting input terminal configured to receive the reference potential and an inverting input terminal coupled to the second electrode, and the capacitance circuit comprises:
first feedback capacitance coupled between an output of the first operational amplifier and the inverting input terminal;
first offset capacitance having a first end configured to receive an offset potential and a second end coupled to the second electrode;
second feedback capacitance coupled between an output of the second operational amplifier and the inverting input terminal; and
second offset capacitance having a first end configured to receive the offset potential and a second end coupled to the second electrode.

6. The detecting device according to claim 5, wherein the detection circuit is controlled such that the capacitance of the capacitance circuit has a larger value in the first period than in the second period.

7. A detection system comprising:
a detecting device comprising:
a plurality of first electrodes extending in a first direction and a plurality of second electrodes extending in a second direction intersecting the first direction, the first electrodes and the second electrodes being disposed facing each other with an insulating layer interposed therebetween;
a first electrode selection circuit configured to supply a drive signal to the first electrodes; and
a detection circuit configured to detect capacitance generated between the first electrodes and the second electrodes due to the drive signal; and
a fingerprint pattern generating device configured to generate a fingerprint pattern based on output from the detecting device, wherein
the first electrode selection circuit has a first period for selecting all the first electrodes included in one detection unit and a second period for selecting some of the first electrodes included in the detection unit out of the first electrodes,
the detection circuit comprises a voltage detector including a capacitance circuit capable of changing capacitance for each of the second electrodes,
the capacitance of the capacitance circuit is controlled to have different values between the first period and the second period,
the detection circuit comprises the voltage detector for each of the second electrodes,
the voltage detector includes an operational amplifier having a non-inverting input terminal configured to receive a reference potential and an inverting input terminal coupled to the second electrode, and
the capacitance circuit comprises:
first feedback capacitance coupled between an output of the operational amplifier and the inverting input terminal in the first period and cut off in the second period;
first offset capacitance having a first end configured to receive an offset potential and a second end coupled to the second electrode in the first period and cut off in the second period;
second feedback capacitance coupled between the output of the operational amplifier and the inverting input terminal in the second period and cut off in the first period; and
second offset capacitance having a first end configured to receive the offset potential and a second end coupled to the second electrode in the second period and cut off in the first period.

8. The detection system according to claim 7, wherein the detection circuit is controlled such that the capacitance of the capacitance circuit has a larger value in the first period than in the second period.

9. A detection system comprising:
a detecting device comprising:
a plurality of first electrodes extending in a first direction and a plurality of second electrodes extending in a second direction intersecting the first direction, the first electrodes and the second electrodes being disposed facing each other with an insulating layer interposed therebetween;
a first electrode selection circuit configured to supply a drive signal to the first electrodes; and
a detection circuit configured to detect capacitance generated between the first electrodes and the second electrodes due to the drive signal; and
a fingerprint pattern generating device configured to generate a fingerprint pattern based on output from the detecting device, wherein
the first electrode selection circuit has a first period for selecting all the first electrodes included in one detection unit and a second period for selecting some of the first electrodes included in the detection unit out of the first electrodes,
the detection circuit comprises a voltage detector including a capacitance circuit capable of changing capacitance for each of the second electrodes,
the capacitance of the capacitance circuit is controlled to have different values between the first period and the second period,
the detection circuit comprises the voltage detector for each of the second electrodes,
the voltage detector includes an operational amplifier having a non-inverting input terminal configured to receive a reference potential and an inverting input terminal coupled to the second electrode, and
the capacitance circuit comprises:
first feedback capacitance always coupled between an output of the operational amplifier and the inverting input terminal;
second feedback capacitance coupled in parallel with the first feedback capacitance in the first period and cut off in the second period;
first offset capacitance having a first end configured to receive an offset potential and a second end always coupled to the second electrode; and
second offset capacitance coupled in parallel with the first offset capacitance in the first period and cut off in the second period.

10. The detection system according to claim 9, wherein the detection circuit is controlled such that the capacitance of the capacitance circuit has a larger value in the first period than in the second period.

11. A detection system comprising:
a detecting device comprising:
a plurality of first electrodes extending in a first direction and a plurality of second electrodes extending in a second direction intersecting the first direction, the first electrodes and the second electrodes being disposed facing each other with an insulating layer interposed therebetween;
a first electrode selection circuit configured to supply a drive signal to the first electrodes; and a detection circuit configured to detect capacitance generated between the first electrodes and the second electrodes due to the drive signal; and a fingerprint pattern generating device configured to generate a fingerprint pattern based on output from the detecting device, wherein the first electrode selection circuit has a first period for selecting all the first electrodes included in one detection unit and a second period for selecting some of the first electrodes included in the detection unit out of the first electrodes, the detection circuit comprises a voltage detector including a capacitance circuit capable of changing capacitance for each of the second electrodes, the capacitance of the capacitance circuit is controlled to have different values between the first period and the second period, the detection circuit comprises a first voltage detector coupled in the first period and cut off in the second period and a second voltage detector coupled in the second period and cut off in the first period for each of the second electrodes, the first voltage detector includes a first operational amplifier having a non-inverting input terminal configured to receive a reference potential and an inverting input terminal coupled to the second electrode, the second voltage detector includes a second operational amplifier having a non-inverting input terminal configured to receive the reference potential and an inverting input terminal coupled to the second electrode, and the capacitance circuit comprises:
- first feedback capacitance coupled between an output of the first operational amplifier and the inverting input terminal;
- first offset capacitance having a first end configured to receive an offset potential and a second end coupled to the second electrode;
- second feedback capacitance coupled between an output of the second operational amplifier and the inverting input terminal; and
- second offset capacitance having a first end configured to receive the offset potential and a second end coupled to the second electrode.

12. The detection system according to claim 11, wherein the detection circuit is controlled such that the capacitance of the capacitance circuit has a larger value in the first period than in the second period.

* * * * *